J. A. & E. E. SOWELL.
RETAINING SCREW CLAMP.
APPLICATION FILED JAN. 8, 1917.

1,299,253.

Patented Apr. 1, 1919.
2 SHEETS—SHEET 1.

WITNESS
Bernard Privat

INVENTORS
John A. Sowell & Ernest E. Sowell
BY
Percy G. Webster
ATTORNEY

J. A. & E. E. SOWELL.
RETAINING SCREW CLAMP.
APPLICATION FILED JAN. 8, 1917.
1,299,253.
Patented Apr. 1, 1919.
2 SHEETS—SHEET 2.
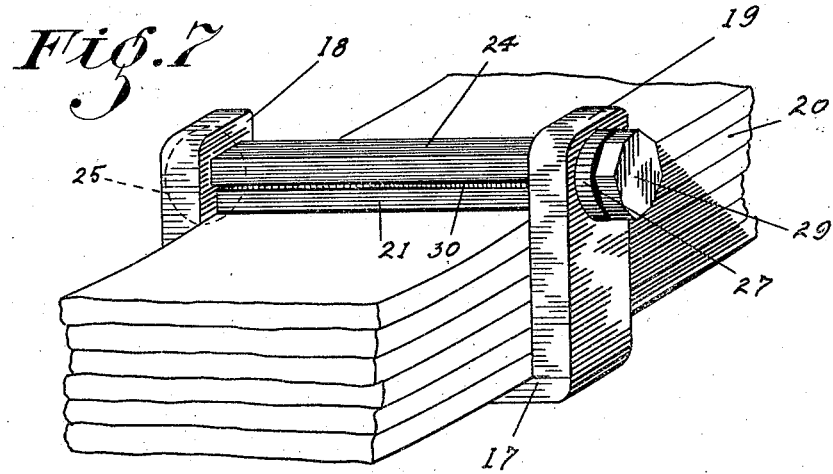
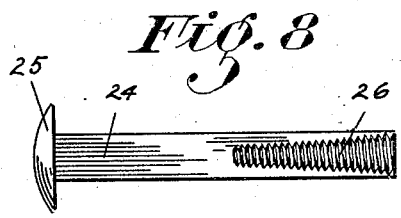
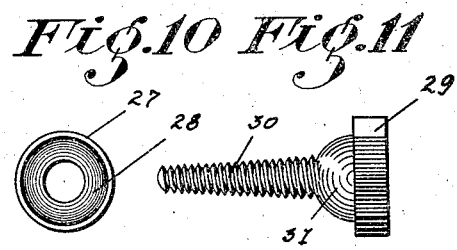
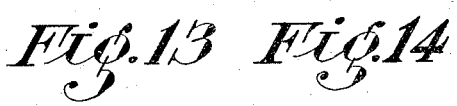
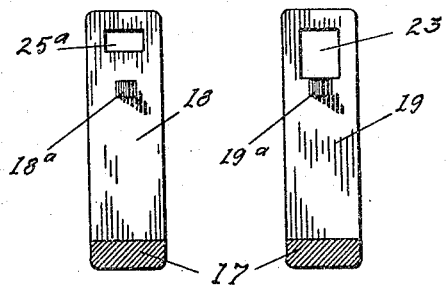
WITNESS
Bernard Privat
INVENTOR.
John A. Sowell & Ernest E. Sowell
BY
ATTORNEY

UNITED STATES PATENT OFFICE.

JOHN A. SOWELL AND ERNEST E. SOWELL, OF SACRAMENTO, CALIFORNIA.

RETAINING SCREW-CLAMP.

1,299,253.     Specification of Letters Patent.     Patented Apr. 1, 1919.

Application filed January 8, 1917. Serial No. 141,118.

*To all whom it may concern:*

Be it known that we, JOHN A. SOWELL and ERNEST E. SOWELL, citizens of the United States, residing at Sacramento, in the county of Sacramento, State of California, have invented certain new and useful Improvements in Retaining Screw-Clamps; and we do declare the following to be a full, clear, and exact description of the same, reference being had to the accompanying drawings, and to the characters of reference marked thereon, which form a part of this application.

This invention relates to improvements in clamps for binding or clamping parts of mechanism together and is particularly designed for use in connection with clamping demountable rims upon the wheels of motor vehicles and also for use in connection with clamping the leaves of the springs of motor vehicles. The object of the invention is to produce a clamp which will displace the now commonly used wedge retaining members and which instead of said wedge retaining members will employ retaining clamps arranged to be frictionally clamped in engagement with the demountable rim by means of tapered screws. These screws will be so constructed that they will have a quick action against the expanding clamps and when they are set in position will be held therein by the weight of the vehicle binding against the threads of the screws. At the same time they will be so constructed it will be very easy to remove or replace the same with very little effort, this latter advantage being gained by providing a half ball bearing joint between the head of the screw and the ends of the clamp.

A still further object of the invention is to produce a retainer the life of which will be as long as the machinery to which it may be applied and one in which none of its parts will have to be replaced due to a battering of the threads of the bolts or nuts as is now often the common experience. In addition to this even if one part of the clamp should by any chance be worn out, it is not necessary to renew the entire clamp but only that portion which is worn.

A further object of the invention is to produce a simple and inexpensive device and yet one which will be exceedingly effective for the puropses for which it is designed.

These objects we accomplish by means of such structure and relative arrangement of parts as will fully appear by a perusal of the following specification and claims.

In the drawings similar characters of reference indicate corresponding parts in the several views.

Fig. 7 is a perspective view showing the application of our improved half ball bearing screw clamp to the binding yoke for clamping leaf springs together.

Fig. 8 is a bottom plan view of the upper clamping member shown in Fig. 7.

Fig. 9 is a top plan view of the lower clamping member shown in Fig. 7.

Fig. 10 is a plan view of a socketed washer designed to receive the half ball shaped head of the clamping screw.

Fig. 11 is a side elevation of the clamping screw shown in Fig. 7.

Fig. 12 is a detached view of one of the spring leaves.

Fig. 13 is a sectional view of the spring yoke.

Fig. 14 is a similar view showing the opposite end of the yoke to that shown in Fig. 13.

In here describing the invention we illustrate it as it is used in connection with the clamping of a demountable rim upon the felly of the wheel and for clamping leaf springs together although it may be used for many other purposes as will be found desirable.

Referring now more particularly to the characters of reference on the drawings, the numeral 1 designates the felly of the wheel. The numeral 2 designates the annular rim mounted on the felly and having an inner projecting flange 3 against which the demountable rim 4 impinges when mounted upon the wheel.

Figure 5:
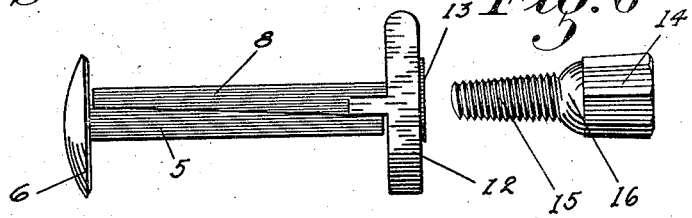
Fig. 5 is a side elevation of the half ball bearing screw clamp with the tapered screw withdrawn therefrom.
Figure 6:
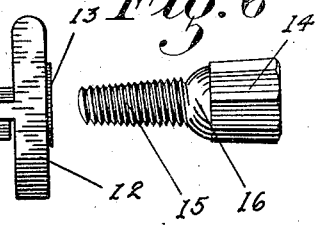
Fig. 6 is a side elevation of the tapered screw showing the half ball bearing head thereon.

Our improved clamp when used for clamping the rim 4 on the wheel consists of a bottom bar 5 which is countersunk in the felly 1 and rim 2. This bar 5 is provided with a head 6 which impinges against the outer edge of the felly and the rim 2. This holds the member 5 in proper position but if such member 5 were built into the felly as a component part thereof then this head could be done away with. The member 5 is provided in its upper face with a semi-circular groove which is threaded for a portion of its length as at 7. The numeral 8 designates the other clamping member which is similar in shape to the member 5 and which is provided in its under face with a semi-circular groove 9 with the threads 10 for a portion of its length. The threads 10 are arranged to be placed in inverted relation with respect to the threads 7 so that the threads 10 will register with the threads 7 when the two members are placed together as shown in Fig. 5. This, then, forms a substantially circular threaded opening between the parts which terminates in an orifice 11 in an end flange 12 formed as a component part of the member 8. This flange 12 is so arranged as to engage the outer edge of the rim 4 when the two clamping members are mounted in position under the inner periphery thereof. The flange 12 immediately surrounding the opening 11 is provided with a cup shaped bearing member 13. A screw 14 is provided with a tapered thread 15 terminating at its inner end in a half ball shaped head 16 arranged to bear smoothly against the bearing member 13, thus forming a half ball bearing joint between the screw head and the clamping members.

Figure 1:
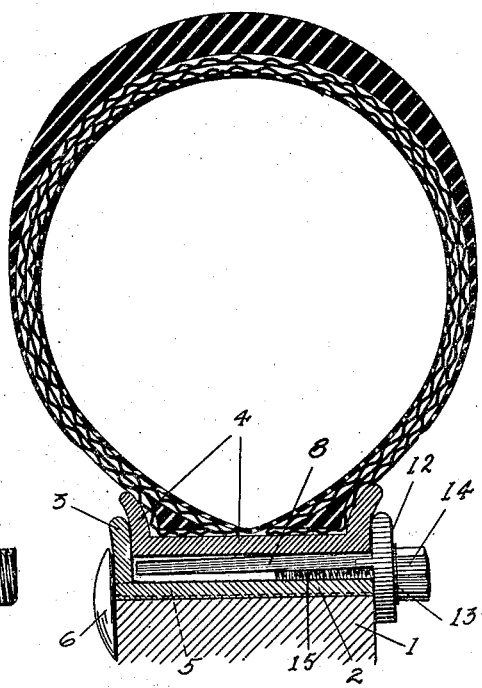
Figure 1 is a cross sectional view of a pneumatic tire with a demountable rim in which the same is secured to the felly of the wheel by one of our improved half ball bearing clamps.
Figure 2:
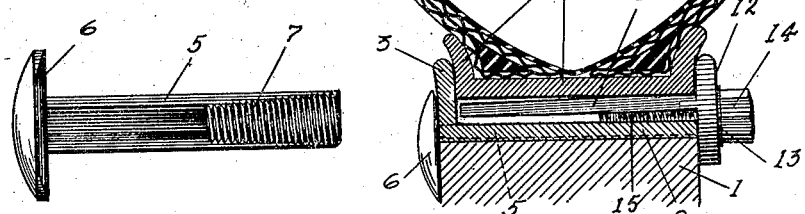
Fig. 2 is a top plan view of the lower part of the clamp.
Figure 3:
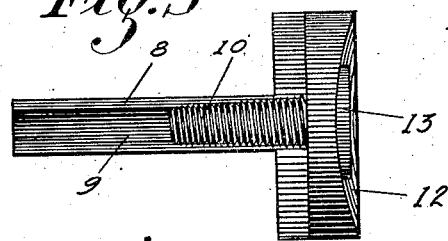
Fig. 3 is a bottom plan view of the upper part of the clamp.
Figure 4:
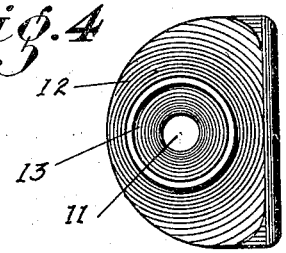
Fig. 4 is an end view of the construction shown in Fig. 3.

When the clamp is to be used to fix the rim 4 on to the felly 2 the two clamping members are placed in the position as shown in Fig. 5. The contacting surfaces of the two clamp members are inclined as shown in said Fig. 5, so that if the rim 4 should happen to drag close to the rim 2 at any point, the clamp may nevertheless be readily positioned between the two, since the inclined surfaces will allow them to be wedged into position, and this wedging action would easily push the rim 4 into the proper spaced position relative to the rim 2. The screw member 14 is then advanced so that the threaded portion 15 will engage the threads 7 and 10. This threaded portion 15 will expand the member 8 with respect to the member 5 as shown in Fig. 1. This will lift the member 8 into engagement with the rim 4. The half ball shaped head 16 will engage the bearing 13 and force the flange 12 into engagement with the side of the rim 4. Thus the rim 4 will be clamped both from underneath and from the outer side and will be held firmly against the flange 3 and on to the felly 1. The ball bearing feature for the parts as provided for by the members 13 and 16 has an advantage of allowing the parts to be engaged with each other in an easy and effective manner and prevents any binding of the same as is now the common disadvantage of the ordinary retaining nut used on the wedge members. This same ball bearing feature also allows of the screw members being quickly and easily removed when it is desired to withdraw the demountable rim from the wheel.

In Figs. 7 to 14 inclusive we have shown the adaptation of our improved half ball bearing clamping means to the retaining yoke used in clamping or screwing a plurality of spring leaves together for use on motor or other vehicles.

In this adaptation of the invention the same is applied to the retaining yoke for the spring leaves, which yoke comprises the bottom yoke 17 and the side flanges 18 and 19. The spring leaves 20 are received between these flanges 18 and 19 and are clamped in position therein by means of our improved invention. The numeral 21 designates the bottom clamping member which lies flat on the uppermost spring leaf 20 and thus the threaded end 22 projects through the slot 23 into the flange 19 to a point flush with the outer side of such flange. The upper member 24 of the clamp is provided with a flange head 25. This member 24 is projected through a slot 25$^a$ into the flange 18 until the head 25 fits against the outside of the flange 18. The opposite end of the member 24 is provided with threads 26 adapted to register with the threads 22. This threaded end 26 also projects through the slot 23 to a point flush with the outside of the flange 19. We then provide a washer 27 provided with a semi-spherical shaped socket 28. The clamping screw 29 is provided with the tapered threaded portion 30 arranged to project through the washer 27 and into threads 22 and 26. This action spreads the members 21 and forces the member 21 down against the spring leaves 20. The half ball shaped head 31 on the screw 29 engages the socket 28 and as the threads 30 are advanced into the threads 22 and 26 this draws the flanges 18 and 19 toward each other and thus the spring leaves are clamped both from the top and sides. The flanges 18 and 19 have small projecting V shaped lugs 18$^a$ and 19$^a$ adapted to fit into the incisions 20$^a$ in the spring leaf 20 to prevent the yoke having any longitudinal movement.

We have described our improved invention as it may be applied to retaining clamps for demountable rims and also as it may be applied to the yokes for the spring leaf as desired. These two descriptions will show the adaptation of the clamp for different purposes and it may be equally well adapted to many other forms of mechanism.

From the foregoing description it will be readily seen that we have produced such a device as substantially fulfils the object of the invention as set forth herein.

While this specification sets forth in detail the present and preferred construction of the device, still in practice such deviations from such detail may be resorted to as do not form a departure from the spirit of the invention, as defined by the appended claims.

Having thus described our invention what we claim as new and useful and desire to secure by Letters Patent is:

1. A half ball bearing screw clamp comprising three members, two members provided with semi-circular grooves disposed in reverse position with respect to each other, each groove being threaded and the threads in register with each other, and the third member comprising a tapered screw arranged to be screwed into the said threads to expand the clamping members with respect to each other, one of said clamping members having a retaining flange on its end provided with a central orifice to receive said threaded member, a cup shaped bearing member disposed around said orifice, the screw having a half ball shaped head arranged to fit into the said bearing.

2. A half ball bearing screw clamp comprising clamping members having a cup shaped member at one end, an expanding member comprising a tapered screw arranged to be screwed between the clamping members and terminating at its inner end in a half ball shaped head adapted to fit smoothly into the cup shaped member to lessen the friction between the expanding member and the clamping members when they are tightened together.

3. A half ball bearing screw clamp comprising two members arranged in normal face to face contact and forming a substantially rectangular unit, the contacting faces being provided with coinciding threaded grooves, a cup shaped washer disposed at the ends of said members, a tapered screw adapted to be screwed into said threads, such screw terminating in a half ball shaped head arranged to bear smoothly into the cup shaped washer.

4. A combination with an inner rim having a projecting flange on one edge, an outer rim spaced from the inner rim and bearing against the flange, of a means for clamping the rims together, such means including two members adapted to be projected between the rims in face to face contact, the contacting surfaces being provided with threaded grooves, one of said members being provided with an outer cross-head arranged to bear against the free sides of both of the rims, such cross-head being provided with an orifice in register with the threaded grooves and a tapered screw adapted to be threaded between said members to force them apart and clamp the two rims together.

In testimony whereof we affix our signatures.

JOHN A. SOWELL.
ERNEST E. SOWELL.